(12) United States Patent
Prins et al.

(10) Patent No.: US 12,196,468 B2
(45) Date of Patent: Jan. 14, 2025

(54) METHOD FOR CONFIGURING SETPOINTS FOR A VAPOUR COMPRESSION SYSTEM

(71) Applicant: Danfoss A/S, Nordborg (DK)

(72) Inventors: Jan Prins, Sonderborg (DK); Peter Reichwald, Nordborg (DK); Salvatore Piscopiello, Nordborg (DK)

(73) Assignee: DANFOSS A/S, Nordborg (DK)

( * ) Notice: Subject to any disclaimer, the term of this patent is extended or adjusted under 35 U.S.C. 154(b) by 419 days.

(21) Appl. No.: 17/514,002

(22) Filed: Oct. 29, 2021

(65) Prior Publication Data

US 2022/0196305 A1 Jun. 23, 2022

(30) Foreign Application Priority Data

Dec. 18, 2020 (EP) .................................... 20215574

(51) Int. Cl.
*F25B 49/02* (2006.01)
*G05B 13/02* (2006.01)

(52) U.S. Cl.
CPC ............ *F25B 49/02* (2013.01); *G05B 13/024* (2013.01); *F25B 2500/19* (2013.01)

(58) Field of Classification Search
CPC .................. F25B 49/02; F25B 2500/19; F25B 2400/0401; F25B 2400/075;
(Continued)

(56) References Cited

U.S. PATENT DOCUMENTS 3,020,697 A 2/1962 Sherman
5,191,643 A 3/1993 Alsenz et al.
(Continued)

FOREIGN PATENT DOCUMENTS

CN 108603709 A 9/2018
CN 109219724 A 1/2019
(Continued)

OTHER PUBLICATIONS

First Examination Report for Indian Patent Application No. 202114045292 dated Jun. 29, 2022.
(Continued)

*Primary Examiner* — Chad G Erdman
(74) *Attorney, Agent, or Firm* — McCormick, Paulding & Huber PLLC (57) ABSTRACT

A method for configuring a plurality of operating setpoints for a vapour compression system (1) is disclosed. The plurality of operating setpoints are divided into a first group (12) of operating setpoints to be generated manually and a second group (13) of operating setpoints to be generated automatically, and the operating setpoints are operated in accordance therewith. The manually generated operating setpoints (12) and the automatically generated operating setpoints (13) are provided to a setpoint manager (11), and the setpoint manager (11) checks if the provided operating setpoints (12, 13) are in compliance with a set of rules. In the case that at least some of the provided operating setpoints (12, 13) are not in compliance with the set of rules, the setpoint manager (11) adjusts at least some of the provided operating setpoints (12, 13) in accordance with the set of rules, thereby obtaining an adjusted set of operating setpoints. The vapour compression system (1) is subsequently controlled in accordance with the adjusted set of operating setpoints.

19 Claims, 4 Drawing Sheets

(58) Field of Classification Search
CPC .............. F25B 2600/2501; F25B 39/00; F25B 41/30; F25B 41/40; G05B 13/024; G05B 19/0428
See application file for complete search history.

(56) References Cited

U.S. PATENT DOCUMENTS

| | | | |
|---|---|---|---|
| 5,515,267 A | | 5/1996 | Alsenz et al. |
| 6,250,382 B1 | | 6/2001 | Rayburn et al. |
| 7,606,683 B2 | | 10/2009 | Bahel et al. |
| 8,596,550 B2 | | 12/2013 | Steinburg et al. |
| 2005/0268630 A1 | | 12/2005 | Pepin et al. |
| 2006/0212174 A1 | | 9/2006 | Garmon et al. |
| 2013/0186119 A1 | | 7/2013 | Burns et al. |
| 2015/0323209 A1* | 11/2015 | Khiani | ............ F24F 11/62 700/276 |
| 2019/0376728 A1* | 12/2019 | Hayes | ............ F25B 41/20 |
| 2021/0157284 A1* | 5/2021 | Mahoney | ............ G06F 9/54 |
| 2021/0285668 A1* | 9/2021 | Uerkvitz | ............ G05B 19/0426 |
| 2022/0082286 A1* | 3/2022 | Atchison | ............ F24F 11/64 |
| 2022/0316741 A1* | 10/2022 | Nishimura | ............ F24F 11/86 |

FOREIGN PATENT DOCUMENTS

| | | | |
|---|---|---|---|
| EP | 2817685 B1 | 4/2016 | |
| EP | 3 628 942 A1 | 4/2020 | |
| EP | 3628943 A1 | 4/2020 | |
| JP | 2019-148394 A | 9/2019 | |
| WO | WO-2021055626 A1 * | 3/2021 | ............ F24F 11/30 |

OTHER PUBLICATIONS

Hearing Notice for Indian Patent Application No. 202114045292, dated Dec. 20, 2023.

* cited by examiner

METHOD FOR CONFIGURING SETPOINTS FOR A VAPOUR COMPRESSION SYSTEM

CROSS-REFERENCE TO RELATED APPLICATION

This application claims foreign priority benefits under 35 U.S.C. § 119 to European Patent Application No. 20215574.3 filed on Dec. 18, 2020, the content of which is hereby incorporated by reference in its entirety.

TECHNICAL FIELD

The present invention relates to a method for configuring a plurality of setpoints for a vapour compression system. The method according to the invention provides a high degree of flexibility for users, while ensuring that the vapour compression system can be operated in an appropriate manner and without mutual conflicts between the setpoints.

BACKGROUND

When operating a vapour compression system, such as a refrigeration system, a heat pump, etc., various operating parameters, e.g. pressure levels and/or temperature levels in the vapour compression system, need to be kept within certain boundaries and/or with certain mutual relationships. In order to ensure this, operating setpoints for the vapour compression system are configured before operation of the vapour compression system is initiated, and possibly also while the vapour compression system is operational.

For small vapour compression systems which are relatively simple to control, and which require a limited number of operating setpoints, the operating setpoints may be configured manually. This provides a high degree of freedom for users of the vapour compression system, in terms of configuring the operating setpoints according to special needs or desires For larger vapour compression systems which require a more complex control, and which may require a vast number of operating setpoints, manual configuration of all the operating setpoints by the user may be too complex, cumbersome and time consuming, and there would be a risk that some of the manually configured operating setpoints would be in conflict with each other. Therefore, in this case the operating setpoints may be configured by the manufacturer of the vapour compression system, and possibly in an at least partly automatic manner. The user may, however, be allowed to manually configure a limited number of operating setpoints, which have been selected by the manufacturer of the vapour compression system. Thus, this limits the freedom of the user of the vapour compression system to configure the operating setpoints as desired. However, the risk of inappropriate operating setpoints and/or conflicts between operating setpoints is minimised EP 2 817 685 B1 discloses a method for configuring a refrigeration system. Operating parameters of a plurality of devices of the refrigeration system are configured by selecting a first device to configure among the plurality of devices, and providing information of valid configurable operating parameters of the first device. At least one of the valid configurable operating parameters of the first device is selected, thereby configuring the first device. Information of operating parameters of other devices of the refrigeration system is provided, based on the configuration of the first device, and based on stored data of the plurality of devices of the refrigeration system. One or more operating parameters of one or more of the other devices are confirmed, thereby configuring the one or more other devices.

SUMMARY

It is an object of embodiments of the invention to provide a method for configuring a plurality of operating setpoints for a vapour compression system, which provides a high degree of freedom for users of the vapour compression system, while minimising the risk of inappropriate operating setpoints and/or conflicts between the operating setpoints.

It is a further object of embodiments of the invention to provide a method for configuring a plurality of operating setpoints for a vapour compression system, in which changes in operating conditions can be reacted to.

According to a first aspect the invention provides a method for configuring a plurality of operating setpoints for a vapour compression system, the method comprising the steps of:

dividing the plurality of operating setpoints into a first group of operating setpoints to be generated manually and a second group of operating setpoints to be generated automatically, generating the operating setpoints of the first group manually, and generating the operating setpoints of the second group automatically, providing the manually generated operating setpoints and the automatically generated operating setpoints to a setpoint manager, the setpoint manager checking if the provided operating setpoints are in compliance with a set of rules, in the case that at least some of the provided operating setpoints are not in compliance with the set of rules, the setpoint manager adjusting at least some of the provided operating setpoints in accordance with the set of rules, thereby obtaining an adjusted set of operating setpoints, and controlling the vapour compression system in accordance with the adjusted set of operating setpoints.

Thus, the first aspect of the invention provides a method for configuring a plurality of operating setpoints for a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system may comprise a compressor unit, a heat rejecting heat exchanger, an expansion device, e.g. in the form of an expansion valve, and an evaporator arranged in a refrigerant path. Refrigerant flowing in the refrigerant path is thereby alternatingly compressed by the compressor unit and expanded by the expansion device, while heat exchange takes place in the heat rejecting heat exchanger and in the evaporator, in such a manner that heat is rejected from the refrigerant in the heat rejecting heat exchanger and heat is absorbed by the refrigerant in the evaporator. The vapour compression system may further comprise a receiver arranged between the outlet of the heat rejecting heat exchanger and the expansion device. In this case gaseous refrigerant may be supplied from the receiver to a receiver compressor, i.e. without passing through the expansion device and the evaporator.

In the present context the term 'operating setpoint' should be interpreted to mean a target value or an upper or lower limit for an operating parameter of the vapour compression system. The operating parameter could, e.g., be a temperature or a pressure prevailing in a certain part of the vapour compression system. The operating setpoints should be configured in a manner which ensures appropriate operation of the vapour compression system.

In the method according to the invention, the plurality of operating setpoints is initially divided into a first group of operating setpoints and a second group of operating setpoints. The operating setpoints of the first group of operating setpoints are to be generated manually, i.e. the user of the vapour compression system is allowed to set these operating setpoints. The operating setpoints of the second group of operating setpoints are to be generated automatically, i.e. the user is not allowed to set these operating setpoints.

Thus, dividing the operating setpoints into the first group of operating setpoints and the second group of operating setpoints is performed as a part of the method according to the invention, i.e. it is not determined beforehand which of the operating setpoints the user is allowed to set, and which the user is not allowed to set. Thereby this is not determined upfront and solely by the manufacturer of the vapour compression system. Instead, the user of the vapour compression system has the possibility of selecting which operating setpoints he or she wants to set manually. This provides a high degree of flexibility. However, since some of the operating setpoints, i.e. the operating setpoints of the second group of operating setpoints, are generated automatically, the burden on the user is limited.

Once the operating setpoints have been divided into the first group of operating setpoints and the second group of operating setpoints, the operating setpoints of the first group of operating setpoints are generated manually, and the operating setpoints of the second group of operating setpoints are generated automatically. Thus, the operating setpoints are generated in accordance with the division into the first and second groups.

The manually generated operating setpoints as well as the automatically generated operating setpoints are then provided to a setpoint manager. Thus, all operating setpoints, regardless of how they were generated, are provided to the setpoint manager. The setpoint manager therefore does not necessary distinguish between the operating setpoints with respect to whether they were generated manually or automatically.

Next, the setpoint manager checks if the provided operating setpoints are in compliance with a set of rules. The set of rules may, e.g., define certain limits for the operating setpoints which ensure appropriate operation of the vapour compression system. This will be described in further detail below. Thus, the setpoint manager checks whether or not the provided operating setpoints would cause inappropriate operation of the vapour compression system, if the vapour compression system was operated in accordance with the provided operating setpoints, e.g. including whether or not the provided operating setpoints are in conflict with each other and/or whether or not there is a risk that the vapour compression system may be operated outside its design limits.

Thus, in the case that at least some of the provided operating setpoints are not in compliance with the set of rules, the setpoint manager adjusts at least some of the provided operating setpoints in accordance with the set of rules. Thereby an adjusted set of operating setpoints is obtained. Accordingly, if the originally generated operating setpoints are not in compliance with the set of rules, then the setpoint manager adjusts at least some of the operating setpoints in such a manner that the set of rules are complied with.

Finally, the vapour compression system is controlled in accordance with the adjusted set of operating setpoints. Since the setpoint manager has ensured that the adjusted set of operating setpoints is in compliance with the set of rules, it is thereby ensured that the vapour compression system is operated in an appropriate manner.

Accordingly, the method according to the invention allows the user of the vapour compression system to select which of the operating setpoints he or she wants to set manually. Simultaneously, the setpoint manager ensures that all of the operating setpoints, manually generated and automatically generated alike, fulfil the set of rules, thereby ensuring that the vapour compression system is operated in an appropriate manner and/or that the operating setpoints are not mutually in conflict with each other. Thus, a high degree of freedom or flexibility for the user is obtained, while preventing conflicts among operating setpoints and/or with design limits of the vapour compression system or ambient conditions. Furthermore, since some of the operating setpoints are generated automatically, the burden on the user of the vapour compression system is limited.

It is not ruled out that, even though the setpoint manager adjusts at least some of the provided operating setpoints due to non-compliance with the set of rules, the originally provided operating setpoints may be stored in order to allow them to be restored, e.g. in the case that operating conditions of the vapour compression system change in such a manner that the original operating setpoints comply with the set of rules.

The method may further comprise the step of, in the case that the provided operating setpoints are in compliance with the set of rules, controlling the vapour compression system in accordance with the provided operating setpoints.

According to this embodiment, the originally generated operating setpoints are simply applied if it turns out that they are actually in compliance with the set of rules. However, the setpoint manager still checks that this is the case, and thereby it is still ensured that the vapour compression system is operated in an appropriate manner.

The method may further comprise the steps of:
while controlling the vapour compression system, checking whether or not the operating setpoints are in compliance with prevailing operating conditions,
in the case that at least one of the operating setpoints is not in compliance with prevailing operating conditions, the setpoint manager adjusting at least some of the operating setpoints, thereby obtaining a newly adjusted set of operating setpoints, and
subsequently controlling the vapour compression system in accordance with the newly adjusted set of operating setpoints.

According to this embodiment, the applied operating setpoints are checked against prevailing operating conditions, while the vapour compression system is controlled in accordance with the applied operating setpoints. Operating conditions may change over time, and thereby values for the operating setpoints which are appropriate may also change over time. For instance, changing operating conditions may change the set of rules which the operating setpoints need to comply with. The step of checking whether or not the operating setpoints are in compliance with prevailing operating conditions may be based on sensor measurements of relevant parameters, such as ambient temperature, refrigerant temperatures at various positions along the refrigerant path, refrigerant pressures at various positions along the refrigerant path, etc.

Thus, according to this embodiment, it is repeatedly or continuously checked that the applied operating setpoints are appropriate in relation to the prevailing operating conditions. If it turns out that at least one of the operating setpoints is not in compliance with the prevailing operating conditions, the setpoint manager adjusts at least some of the operating setpoints, similarly to what is described above. Thereby a newly adjusted set of operating setpoints is obtained. The newly adjusted set of operating setpoints could, e.g., be the originally generated operating setpoints. This could, e.g., be relevant in the case that the operating conditions have changed in such a manner that the originally generated operating setpoints now comply with the set of rules.

Subsequently, the vapour compression system is controlled in accordance with the newly adjusted set of operating setpoints. Accordingly, it is repeatedly or continuously ensured that the applied operating setpoints are in compliance with the prevailing operating conditions. Furthermore, if this requires adjustment of at least some of the operating setpoints, then the setpoint manager handles this without requiring intervention by an operator, and while observing the set of rules which needs to apply. For instance, the setpoint manager continues to ensure that the operating setpoints are not in conflict with each other.

This embodiment is particularly relevant in the case that the operating conditions change in an unexpected manner, e.g. in the case of extreme operating conditions, such as exceptionally high or low ambient temperatures. Such extreme conditions may not be foreseen when initially configuring the operating setpoints of the vapour compression system, and it may affect operation of the vapour compression system in an undesirable manner, and/or in a manner which requires adjustment of at least some of the operating setpoints in order to keep the vapour compression system running. Moreover, a set of manual operating setpoints that is designed to handle extreme conditions may not be optimal under regular conditions. Since the adjustment of the operating setpoints is, according to this embodiment, handled by the setpoint manager, it is not necessary for the user to manually adjust the operating setpoints, and thereby it is not left to the user to decide which operating setpoints to adjust, and in which manner. It is also not necessary to summon a technical expert or maintenance personnel. Thereby the vapour compression system can be kept operational, even during extreme ambient conditions.

The step of the setpoint manager adjusting the provided operating setpoints in accordance with the set of rules may comprise adjusting operating setpoints of the second group before adjusting setpoints of the first group.

According to this embodiment, in the case that it is determined that at least some of the operating setpoints are not in compliance with the set of rules, and that it is therefore necessary to adjust at least some of the operating setpoints, then the setpoint manager selects which of the originally generated operating setpoints to adjust, and which of the originally generated operating setpoints to keep. This is done is such a manner that it is prioritized to keep the operating setpoints which have been manually set by the user. Therefore, the setpoint manager will attempt to obtain a set of operating setpoints which complies with the set of rules by adjusting only operating setpoints of the second group of operating setpoints, i.e. operating setpoints which were generated automatically, and thereby keeping the operating setpoints of the first group of operating setpoints, i.e. the setpoints which were generated manually. Thereby the operating setpoints which the user has specified manually are kept to the greatest possible extent. However, in the case that it is not possible to comply with the set of rules by adjusting automatically generated operating setpoints alone, then the setpoint manager will also adjust at least some of the manually generated operating setpoints.

Alternatively or additionally, similar prioritization of the operating setpoints may be applied, which is independent of whether the operating setpoints were generated manually or automatically.

The set of rules may comprise specifications regarding mutual distances between the operating setpoints.

According to this embodiment, the set of rules specifies how the operating setpoints need to relate to each other in order to ensure that they are not in conflict with each other. More particularly, the set of rules specifies mutual distances between at least some of the operating setpoints, i.e. how far the operating setpoints need to be apart in order to ensure appropriate operation of the vapour compression system. For instance, some of the operating setpoints need to be appropriately spaced apart in order to ensure that refrigerant is appropriately driven through the vapour compression system and/or that appropriate heat transfer takes place in the heat rejecting heat exchanger and/or in the evaporator.

Thus, according to one embodiment, at least some of the provided operating setpoints may be pressure setpoints to be applied for pressure levels in various parts of the vapour compression system, and the set of rules may comprise specifications regarding mutual distances in pressure levels in the various parts of the vapour compression system.

For instance, in the case that the vapour compression system comprises a receiver arranged in the refrigerant path between an outlet of the heat rejecting heat exchanger and the expansion device, then there must be a certain difference between the pressure prevailing inside the receiver and the suction pressure, i.e. the pressure at an inlet of the compressor unit, in order to ensure an appropriate supply of refrigerant to the evaporator.

Alternatively or additionally, the set of rules may comprise specifications regarding mutual distances in temperature levels in various parts of the vapour compression system. For instance, a certain distance between the temperature of refrigerant passing through the heat rejecting heat exchanger or the evaporator, and the temperature of a fluid medium applied for performing heat exchange may be required in order to ensure appropriate heat transfer.

According to one embodiment, two of the operating setpoints may defined lower and upper limits for an operating parameter. One rule may require that the upper and lower limits are sufficiently spaced apart to accommodate one or more further operating setpoints between the lower and upper limits. Thus, if the limits are set too close to each other, at least one of them needs to be adjusted. In this case, the operating setpoints may be adjusted in such a manner that the lower limit is decreased, while the upper limit is maintained. Thereby it is ensured that the operating parameter is not allowed increase to a level which is outside the design specifications of the vapour compression system.

Alternatively or additionally, the set of rules may comprise specifications regarding mutual order of the operating setpoints.

According to this embodiment, the set of rules specifies how the operating setpoints relate to each other, in terms of which operating setpoints need to be higher or lower than other operating setpoints in order to ensure appropriate operation of the vapour compression system. For instance, in the case that some of the operating setpoints specify upper or lower limits for operating parameters, e.g. parameter values which trigger initiation of certain measures in order to ensure continued operation of the vapour compression system, then the order of the operating setpoints may ensure that various measures are initiated in a correct order. This may, e.g., ensure that more severe measures are only initiated if less severe measures turn out to be insufficient.

Thus, according to one embodiment, at least some of the provided operating setpoints may be pressure setpoints to be applied for pressure levels in various parts of the vapour compression system, and the set of rules may comprise specifications regarding mutual order of at least two pressure levels in the various parts of the vapour compression system.

For instance, the operating setpoints may be pressure threshold values for the pressure prevailing in a receiver arranged in the refrigerant path between an outlet of the heat rejecting heat exchanger and the expansion device. Each pressure threshold value may be set to trigger an action, in the case that the pressure prevailing in the receiver decreases below the pressure threshold value, the action being intended to prevent the pressure in the receiver from decreasing further, or even to cause the pressure in the receiver to increase. One such action could be stopping one or more receiver compressors and/or closing a bypass valve. This would reduce the flow of gaseous refrigerant out of the receiver, and thereby increase the pressure in the receiver, or at least reduce a decrease of the pressure in the receiver. Another action could be to reduce a secondary fluid flow across the heat rejecting heat exchanger, e.g. by decreasing a fan speed of a fan driving this fluid flow. This will increase the flow of refrigerant into the receiver, thereby increasing the pressure in the receiver. Yet another action could be to increase refrigerant flow into the receiver, e.g. by admitting hot vapour into the receiver by opening a gas dump valve, and/or by increasing an opening degree of the high pressure valve. This will also increase the pressure in the receiver.

It is important that the actions described above are performed in a correct order. For instance, when the pressure in the receiver decreases in a manner which introduces a risk that the vapour compression system may operate in an inappropriate or inefficient manner, then it is desirable to stop the receiver compressors before increasing the opening degree of the high pressure valve. Therefore, the operating setpoint which triggers stopping the receiver compressors should be higher than the operating setpoint which triggers increasing the opening degree of the high pressure valve. For instance, this has the consequence that an operating setpoint which needs to be higher than another operating setpoint must never to adjusted to a value which reverses the order of these two operating setpoints.

Alternatively, the pressure levels may be pressure levels in various parts of the vapour compression system, where one pressure level must be higher than another pressure level in order to ensure proper operation of the vapour compression system.

Alternatively or additionally, the set of rules may comprise specifications regarding mutual order of temperature levels in various parts of the vapour compression system, where one temperature level must be higher than another temperature level, e.g. in order to ensure appropriate heat transfer.

The step of dividing the plurality of operating setpoints into a first group of operating setpoints and a second group of operating setpoints may be performed manually. For instance, this step may be performed by a user of the vapour compression system. This introduces a high degree of flexibility for the user.

The method may be performed by a monitoring system arranged remotely with respect to the vapour compression system.

According to this embodiment, the method is performed from a remote location, e.g. from a central monitoring facility which monitors several vapour compression systems. Thus, the method is not performed locally at the site of the vapour compression system. The monitoring system may, e.g., be configured to monitor that the vapour compression operates appropriately. The monitoring system may, e.g., be operated by personnel which is skilled in identifying abnormal or inefficient operation of vapour compression system, and in handling such abnormal or inefficient operation. Thus, according to this embodiment, the method described above may be provided as a service to the user of the vapour compression system.

As an alternative, the method may be performed locally, i.e. at the location of the vapour compression system. In this case the method may, e.g., be performed by means of a controller of the vapour compression system.

The method may further comprise the step of, in the case that at least some of the provided operating setpoints are not in compliance with the set of rules, the setpoint manager generating a message for an operator of the vapour compression system.

According to this embodiment, the operator of the vapour compression system is at least notified if it turns out that one or more of the operating setpoints need to be adjusted in order to comply with the set of rules. The adjustment of the operating setpoints may still be performed automatically, in which case the generated message is merely information for the operator of the vapour compression system. As an alternative, the operator may subsequently perform the required adjustments manually.

Thus, the message generated by the setpoint manager may include suggestions for adjustments of at least some of the provided operating setpoints.

According to a second aspect the invention provides a method for configuring a plurality of operating setpoints for a vapour compression system, the method comprising the steps of:

dividing the plurality of operating setpoints into a first group of operating setpoints to be generated manually and a second group of operating setpoints to be generated automatically, generating the operating setpoints of the first group manually, and generating the operating setpoints of the second group automatically, providing the manually generated operating setpoints and the automatically generated operating setpoints to a setpoint manager, the setpoint manager checking if the provided operating setpoints are in compliance with a set of rules, and in the case that at least some of the provided operating setpoints are not in compliance with the set of rules, the setpoint manager generating a message for an operator of the vapour compression system.

It should be noted that a person skilled in the art would readily recognise that any feature described in combination with the first aspect of the invention could also be combined with the second aspect of the invention, and vice versa. The remarks set forth above are therefore equally applicable here.

The method according to the second aspect of the invention includes most of the steps of the method according to the first aspect of the invention. More particularly, the method according to the second aspect of the invention includes the steps of dividing the plurality of operating setpoints into a first group of operating setpoints and a second group of operating setpoints, generating the operating setpoints manually and automatically, respectively, providing the generated operating setpoints to a setpoint manager, and the setpoint manager checking if the provided operating setpoints are in compliance with a set of rules. These steps have already been described above with reference to the first aspect of the invention.

However, in the method according to the second aspect of the invention, in the case that at least some of the provided operating setpoints are not in compliance with the set of rules, the setpoint manager generates a message for an operator of the vapour compression system. Thus, according to the second aspect of the invention, the operating setpoints are not necessarily adjusted automatically by the setpoint manager. Instead a message is generated for the operator of the vapour compression system, and the operator may subsequently adjust the relevant operating setpoint manually, or possibly perform other changes in the operation of the vapour compression system in order to ensure that the set of rules is complied with.

The message generated by the setpoint manager may include suggestions for adjustments of at least some of the provided operating setpoints.

According to this embodiment, the message comprises guidance for the operator of the vapour compression system regarding how to adjust the operating setpoints in order to ensure that the set of rules is complied with. The operator may then follow the suggestions, or choose to perform other adjustments.

The method may be performed by a monitoring system arranged remotely with respect to the vapour compression system. This has already been described above. For instance, the monitoring system may not be authorized to perform adjustments to the operating setpoints of the vapour compression system. Therefore the method according to the second aspect of the invention is particularly relevant when the method is performed by a remote monitoring system. Thereby all analysis and decisions which require expertise can be performed remotely, at the monitoring system, and by skilled personnel, and the actual adjustment of the operating setpoints can be performed locally, at the vapour compression system, and by a person being authorized to perform such adjustments.

As an alternative, the method may be performed locally, i.e. at the location of the vapour compression system. In this case the method may, e.g., be performed by means of a controller of the vapour compression system.

BRIEF DESCRIPTION OF THE DRAWINGS

The invention will now be described in further detail with reference to the accompanying drawings in which.

DETAILED DESCRIPTION

Figure 1:
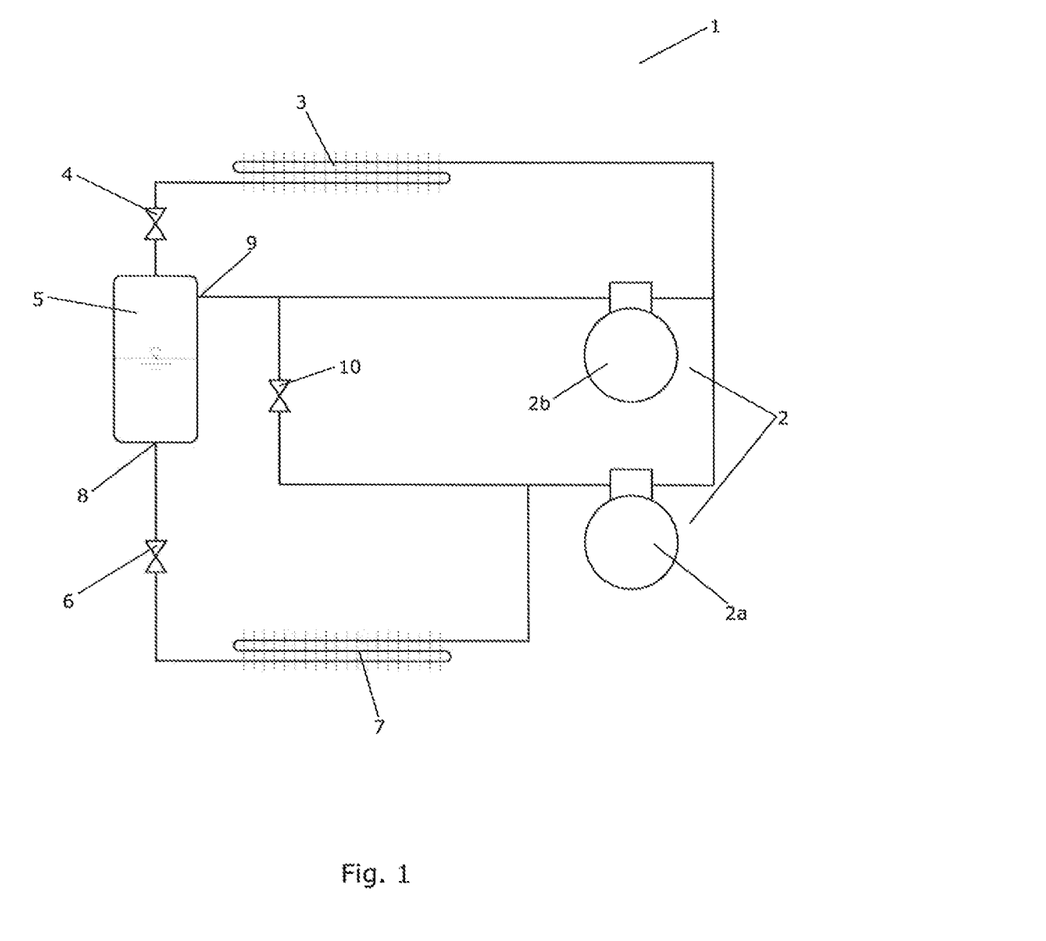
FIG. 1 is a diagrammatic view of a vapour compression system used when performing a method according to an embodiment of the invention.

FIG. 1 is a diagrammatic view of a vapour compression system 1 which may be used when performing a method according to an embodiment of the invention. The vapour compression system 1 comprises a compressor unit 2 comprising a main compressor 2a and a receiver compressor 2b, a heat rejecting heat exchanger 3, a high pressure valve 4, a receiver 5, an expansion device 6 and an evaporator 7 arranged in a refrigerant path.

Thus, refrigerant flowing in the refrigerant path is compressed by means of the compressors 2a, 2b before being supplied to the heat rejecting heat exchanger 3. When the refrigerant passes through the heat rejecting heat exchanger 3, heat exchange takes place between the refrigerant and the ambient or a secondary fluid flow across the heat rejecting heat exchanger 3 in such a manner that heat is rejected from the refrigerant.

The refrigerant leaving the heat rejecting heat exchanger 3 passes through the high pressure valve 4, where it undergoes expansion before entering the receiver 5. In the receiver 5, the refrigerant is separated into a liquid part and a gaseous part. The liquid part of the refrigerant leaves the receiver 5 via a liquid outlet 8, and passes through the expansion device 6, where it undergoes expansion, before being supplied to the evaporator 7. The refrigerant entering the evaporator 7 is thereby a mixture of liquid and gaseous refrigerant. When passing through the evaporator 7, the liquid part of the refrigerant is evaporated, while heat exchange takes place between the refrigerant and the ambient or a secondary fluid flow across the evaporator 7 in such a manner that heat is absorbed by the refrigerant. Finally, the refrigerant is once again supplied to the main compressor 2a.

The gaseous part of the refrigerant in the receiver 5 may be supplied directly to the receiver compressor 2b, via a gaseous outlet 9. Thereby the gaseous part of the refrigerant does not undergo expansion in the expansion device 6, and thereby the decrease in pressure introduced in the expansion device 6 is avoided. Thereby less work is required from the compressor unit 2 in order to compress this part of the refrigerant, and therefore the energy consumption of the vapour compression system 1 can be reduced.

The gaseous part of the refrigerant in the receiver 5 may also be supplied to the main compressor 2a, via a bypass valve 10.

When the vapour compression system 1 is operated, a number of operating setpoints are required in order to ensure appropriate operation of the vapour compression system 1, and therefore these operating setpoints need to be configured. The operating setpoints could, e.g., include setpoints specifying pressure levels at various parts of the vapour compression system 1, e.g. in the receiver 5, at the outlet of the heat rejecting heat exchanger 3, at the inlet of the main compressor 2a, etc. Alternatively or additionally, the operating setpoints could include setpoints specifying temperature levels at various parts of the vapour compressions system 1, such as temperature of refrigerant leaving the heat rejecting heat exchanger 3, evaporating temperature in the evaporator 7, etc.

It is important that the operating setpoints are configured in a manner which ensures appropriate operation of the vapour compression system 1, and in a manner which prevents conflicts between the operating setpoints. In order to ensure this, the operating setpoints are configured in accordance with a method according to an embodiment of the invention.

Figure 2:
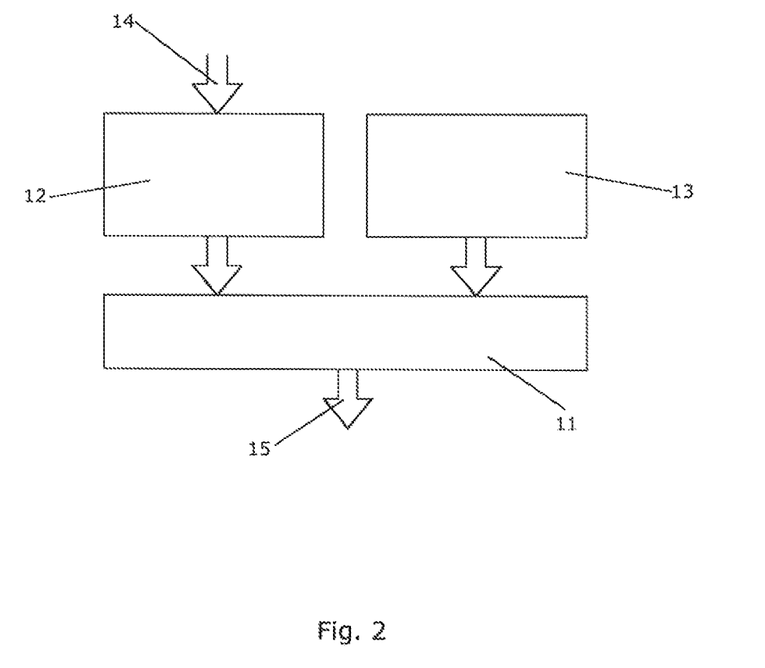
FIG. 2 illustrates operating setpoints being provided to a setpoint manager in accordance with a method according to an embodiment of the invention.

FIG. 2 illustrates operating setpoints being provided to a setpoint manager 11 in accordance with a method according to an embodiment of the invention.

The operating setpoints are divided into a first group of operating setpoints 12 and a second group of operating setpoints 13. The operating setpoints of the first group of operating setpoints 12 are generated manually by a user, via a user interface 14. The operating setpoints of the second group of operating setpoints 13 are generated automatically.

The manually generated operating setpoints, i.e. the operating setpoints of the first group of operating setpoints 12, as well as the automatically generated operating setpoints, i.e. the operating setpoints of the second group of operating setpoints 13, are provided to the setpoint manager 11. Thus, the setpoint manager 11 receives manually generated operating setpoints 12 as well as automatically generated operating setpoints 13, and these are treated on an equal footing by the setpoint manager 11.

The setpoint manager 11 checks if the provided operating setpoints 12, 13 are in compliance with a set of rules. The set of rules may, e.g., specify how the operating setpoints 12, 13 must relate to each other, e.g. in terms of mutual distances between the operating setpoints 12, 13, and/or in terms of mutual order of the operating setpoints 12, 13.

In the case that the setpoint manager 11 established that the provided operating setpoints 12, 13 are in compliance with the set of rules, then the provided operating setpoints 12, 13 are maintained. On the other hand, if it turns out that at least some of the provided operating setpoints 12, 13 are not in compliance with the set of rules, then the setpoint manager 11 adjusts at least some of the operating setpoints 12, 13, thereby obtaining an adjusted set of operating setpoints 12, 13, which comply with the set of rules.

Based on the original or adjusted operating setpoints 12, 13, depending on whether or not the original operating setpoints 12, 13 are in compliance with the set of rules, the setpoint manager 11 applies the operating setpoints 12, 13 to control algorithms 15 and supplies the control algorithms 15 to a controller of a vapour compression system. The vapour compression system is then controlled on the basis of the control algorithms 15, and thereby in accordance with operating setpoints 12, 13.

Figure 3:
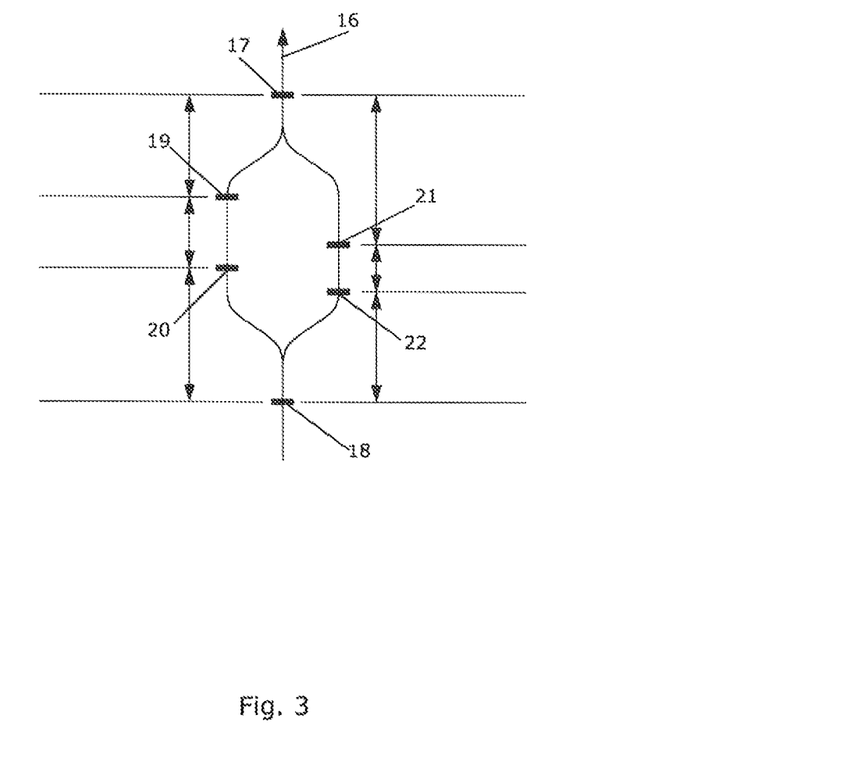
FIG. 3 illustrates mutual relationships among operating setpoints in accordance with a method according to an embodiment of the invention.

FIG. 3 illustrates mutual relationships among operating setpoints in accordance with a method according to an embodiment of the invention. More particularly, FIG. 3 illustrates a number of operating setpoints relating to the pressure prevailing inside a receiver of a vapour compression system, e.g. the vapour compression system illustrated in FIG. 1. Arrow 16 represents the actual pressure in the receiver, increasing from bottom to top in the Figure.

Pressure levels 17, 18, 19, 20, 21 and 22 each represents an operating setpoint. Pressure level 17 represents a receiver pumpdown limit. At receiver pressures above the receiver pumpdown limit 17, the receiver compressor(s) is/are running. However, when the pumpdown limit 17 is reached, the receiver compressor(s) is/are stopped, in order to prevent the receiver pressure 16 from decreasing further.

Pressure level 18 represents a minimum receiver pressure, where an alarm is generated to alert the operator. Thus, it should be avoided that the pressure 16 in the receiver reaches the minimum receiver pressure 18.

Pressure level 19 represents a proportional band (P-band) upper limit, and pressure level 20 represents a proportional band (P-band) lower limit. At pressure levels in the receiver which are within the P-band, i.e. above the P-band lower limit 20 and below the P-band upper limit 19, a normal operation of a high pressure valve arranged between the outlet of the heat rejecting heat exchanger and the receiver is overridden, by enforcing a minimum opening degree on the high pressure valve. Thereby refrigerant is drained from the heat rejecting heat exchanger to the receiver, in an attempt to increase the pressure 16 in the receiver, or at least to stop or reduce a decrease in the pressure 16 in the receiver.

Accordingly, when the receiver pressure 16 decreases to a pressure level corresponding to the P-band upper limit 19, a minimum opening degree is set on the high pressure valve. If the receiver pressure 16 decreases further, the minimum opening degree is increased gradually, until the P-band lower limit 20 is reached. At this pressure level, it is no longer possible to prevent further decrease of the receiver pressure 16 by operating the high pressure valve.

Pressure level 21 represents a hot gas dump cut-out limit, and pressure level 22 represents a hot gas dump cut-in limit. At pressure levels in the receiver which are between the hot gas dump cut-in limit 22 and the hot gas dump cut-out limit 21, hot vapour from the outlet of the compressor is injected into the receiver, in an attempt to increase the receiver pressure 16, or at least prevent it from decreasing further. This is typically done by operating a solenoid valve on a hysteresis.

Accordingly, when the receiver pressure 16 decreases to a pressure level corresponding to the hot gas dump cut-in limit 22, the solenoid valve is opened and hot gas is injected into the receiver. When the receiver pressure 16 once again increases to a pressure level corresponding to the hot gas dump cut-out limit 21, the solenoid valve is closed, thereby stopping the injection of hot gas to the receiver.

Thus, the P-band control as well as the hot gas dump control represent measures which can be taken in order to improve operation of the vapour compression system in the case of a low receiver pressure 16.

For the P-band control it is important that the P-band is arranged between the minimum receiver pressure 18 and the receiver pumpdown limit 17. It is also important that the P-band lower limit 20 is lower than the P-band upper limit 19. Finally, there should be minimum distances between each of the operating setpoints 17, 18, 19, 20, as indicated by double arrows, in order to ensure that the applied measure is allowed to work. Accordingly, the order of these operating setpoints, in increasing order, should be minimum receiver pressure 18, P-band lower limit 20, P-band upper limit 19, and receiver pumpdown limit 17. This may constitute a rule which the operating setpoints need to comply with. The minimum distances between the respective operating setpoints 17, 18, 19, 20 may constitute further rules.

For the hot gas dump control it is also important that the hysteresis band is arranged between the minimum receiver pressure 18 and the receiver pumpdown limit 17. Furthermore, it is important that the hot gas dump cut-in limit 22 is lower than the hot gas dump cut-out limit 21. Finally, there should be minimum distances between each of the operating setpoints 17, 18, 21, 22, as indicated by double arrows, in order to ensure that the measure is allowed to work. Accordingly, the order of these operating setpoints, in increasing order, should be minimum receiver pressure 18, hot gas dump cut-in limit 22, hot gas dump cut-out limit 21, and receiver pumpdown limit 17. This may constitute a rule which the operating setpoints need to comply with. The minimum distances between the respective operating setpoints 17, 18, 21, 22 may constitute further rules.

However, the P-band control and the hot gas dump control may be applied independently of each other. Therefore, there are no rules dictating how the P-band and the hot gas dump hysteresis band should relate to each other. Thus, for instance the hot gas dump upper limit 21 may be adjusted without affecting the P-band upper limit 19 or the P-band lower limit 20.

Figure 4:
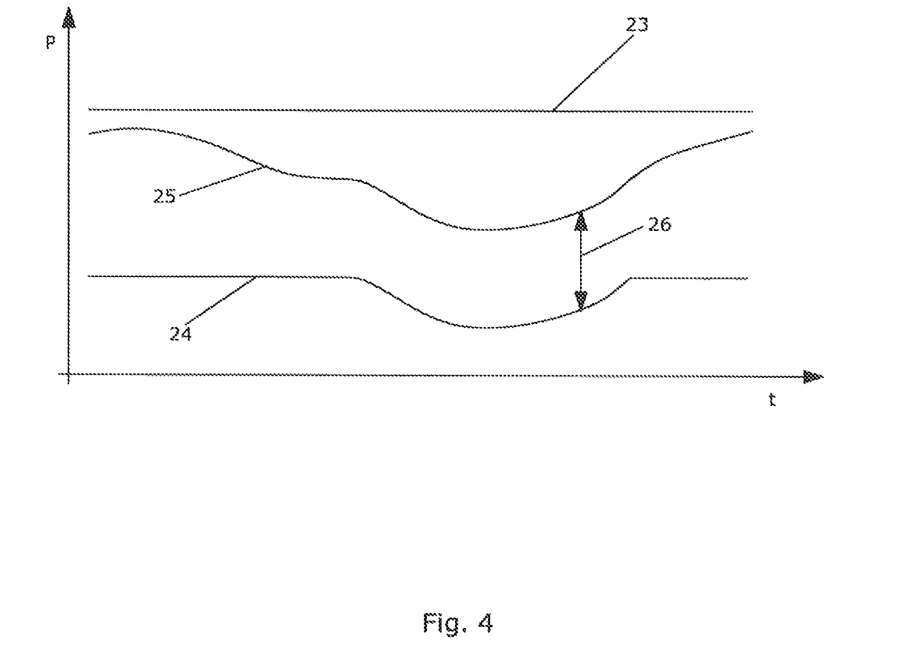
FIG. 4 illustrates adjustment of an operating setpoint during operation of a vapour compression system, in accordance with a method according to an embodiment of the invention.

FIG. 4 illustrates adjustment of an operating setpoint during operation of a vapour compression system, in accordance with a method according to an embodiment of the invention. More particularly, FIG. 4 is a graph illustrating receiver pressure as a function of time.

Line 23 represents a setpoint for the pressure in the receiver, and line 24 represents a setpoint for a pressure at the inlet of the compressor. Line 25 represents the actual pressure in the receiver.

The difference between the pressure 25 in the receiver and the pressure 24 at the inlet of the compressor defines a pressure difference across the expansion device. This pressure difference needs to be at least at a certain minimum in order to ensure a sufficient flow of liquid refrigerant into the evaporator, and thereby an appropriate operation of the vapour compression system. The minimum distance between the receiver pressure 25 and the pressure at the inlet of the compressor is indicated by double arrow 26. This minimum distance 26 may constitute a rule which needs to be complied with by the operating setpoints.

During operation of the vapour compression system, if the receiver pressure 25 decreases to a level which is so close to the setpoint 24 for the pressure at the inlet of the compressor that the minimum distance 26 can not be maintained, then the setpoint 24 for the pressure at the inlet of the compressor is temporarily lowered to a level which is at the minimum distance 26 below the receiver pressure 25. This will cause the actual pressure at the inlet of the compressor to decrease correspondingly, thereby ensuring that the minimum distance 26 is maintained.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for configuring a plurality of operating setpoints for a vapour compression system, the method comprising the steps of:
   dividing the plurality of operating setpoints into a first group of operating setpoints to be generated manually and a second group of operating setpoints to be generated automatically,
   generating the operating setpoints of the first group manually, and generating the operating setpoints of the second group automatically,
   checking if the provided operating setpoints are in compliance with a set of rules,
   in the case that at least some of the provided operating setpoints are not in compliance with the set of rules, adjusting at least some of the provided operating setpoints in accordance with the set of rules, thereby obtaining an adjusted set of operating setpoints, and
   controlling the vapour compression system in accordance with the adjusted set of operating setpoints,
   wherein the operating setpoints are setpoints for operating parameters of one or more devices of the vapour compression system, and
   wherein the set of rules comprises specifications regarding mutual order of the operating setpoints.

2. The method according to claim 1, further comprising the step of, in the case that the provided operating setpoints are in compliance with the set of rules, controlling the vapour compression system in accordance with the provided operating setpoints.

3. The method according to claim 1, further comprising the steps of:
   while controlling the vapour compression system, checking whether or not the operating setpoints are in compliance with prevailing operating conditions,
   in the case that at least one of the operating setpoints is not in compliance with prevailing operating conditions, adjusting at least some of the operating setpoints, thereby obtaining a newly adjusted set of operating setpoints, and
   subsequently controlling the vapour compression system in accordance with the newly adjusted set of operating setpoints.

4. The method according to claim 1, wherein the step adjusting the provided operating setpoints in accordance with the set of rules comprises adjusting operating setpoints of the second group before adjusting setpoints of the first group.

5. The method according to claim 1, wherein the set of rules comprises specifications regarding mutual distances between the operating setpoints.

6. The method according to claim 5, wherein at least some of the provided operating setpoints are pressure setpoints to be applied for pressure levels in various parts of the vapour compression system, and wherein the set of rules comprises specifications regarding mutual distances in pressure levels in the various parts of the vapour compression system.

7. The method according to claim 1, wherein at least some of the provided operating setpoints are pressure setpoints to be applied for pressure levels in various parts of the vapour compression system, and wherein the set of rules comprises specifications regarding mutual order of at least two pressure levels in the various parts of the vapour compression system.

8. The method according to claim 1, wherein the step of dividing the plurality of operating setpoints into a first group of operating setpoints and a second group of operating setpoints is performed manually.

9. The method according to claim 1, wherein the method is performed by a monitoring system arranged remotely with respect to the vapour compression system.

10. The method according to claim 1, further comprising the step of, in the case that at least some of the provided operating setpoints are not in compliance with the set of rules, generating a message for an operator of the vapour compression system.

11. The method according to claim 10, wherein the message includes suggestions for adjustments of at least some of the provided operating setpoints.

12. A method for configuring a plurality of operating setpoints for a vapour compression system, the method comprising the steps of:
   dividing the plurality of operating setpoints into a first group of operating setpoints to be generated manually and a second group of operating setpoints to be generated automatically,
   generating the operating setpoints of the first group manually, and generating the operating setpoints of the second group automatically,
   checking if the provided operating setpoints are in compliance with a set of rules, and in the case that at least some of the provided operating setpoints are not in compliance with the set of rules, generating a message for an operator of the vapour compression system, wherein the operating setpoints are setpoints for operating parameters of one or more devices of the vapour compression system, and wherein the set of rules comprises specifications regarding mutual order of the operating setpoints.

13. The method according to claim 12, wherein the message includes suggestions for adjustments of at least some of the provided operating setpoints.

14. The method according to claim 12, wherein the method is performed by a monitoring system arranged remotely with respect to the vapour compression system.

15. The method according to claim 2, further comprising the steps of:

while controlling the vapour compression system, checking whether or not the operating setpoints are in compliance with prevailing operating conditions, in the case that at least one of the operating setpoints is not in compliance with prevailing operating conditions, adjusting at least some of the operating setpoints, thereby obtaining a newly adjusted set of operating setpoints, and subsequently controlling the vapour compression system in accordance with the newly adjusted set of operating setpoints.

16. The method according to claim 2, wherein the step of adjusting the provided operating setpoints in accordance with the set of rules comprises adjusting operating setpoints of the second group before adjusting setpoints of the first group.

17. The method according to claim 3, wherein the step of adjusting the provided operating setpoints in accordance with the set of rules comprises adjusting operating setpoints of the second group before adjusting setpoints of the first group.

18. The method according to claim 2, wherein the set of rules comprises specifications regarding mutual distances between the operating setpoints.

19. The method according to claim 3, wherein the set of rules comprises specifications regarding mutual distances between the operating setpoints.

* * * * *